Patented Jan. 5, 1954

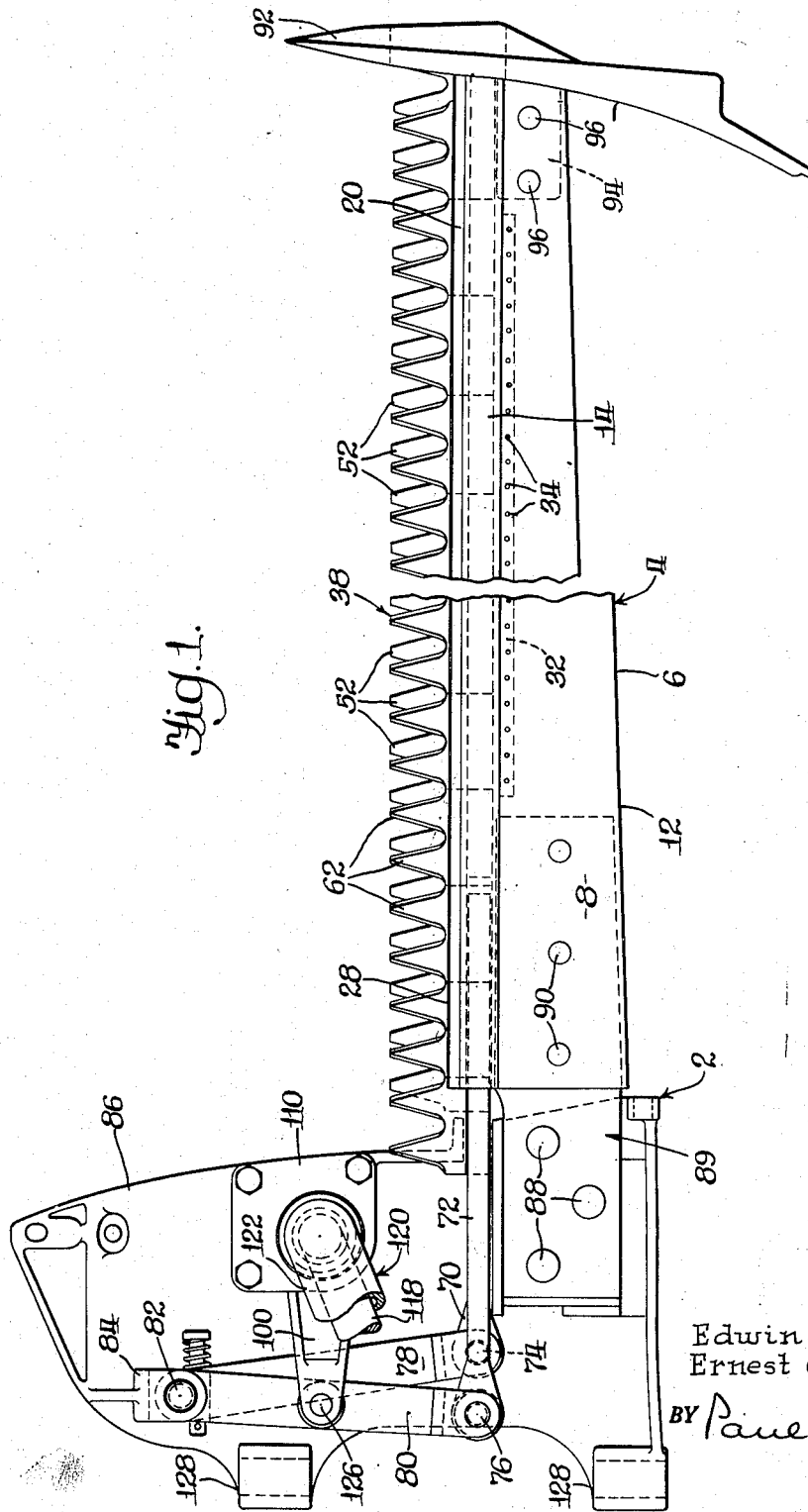

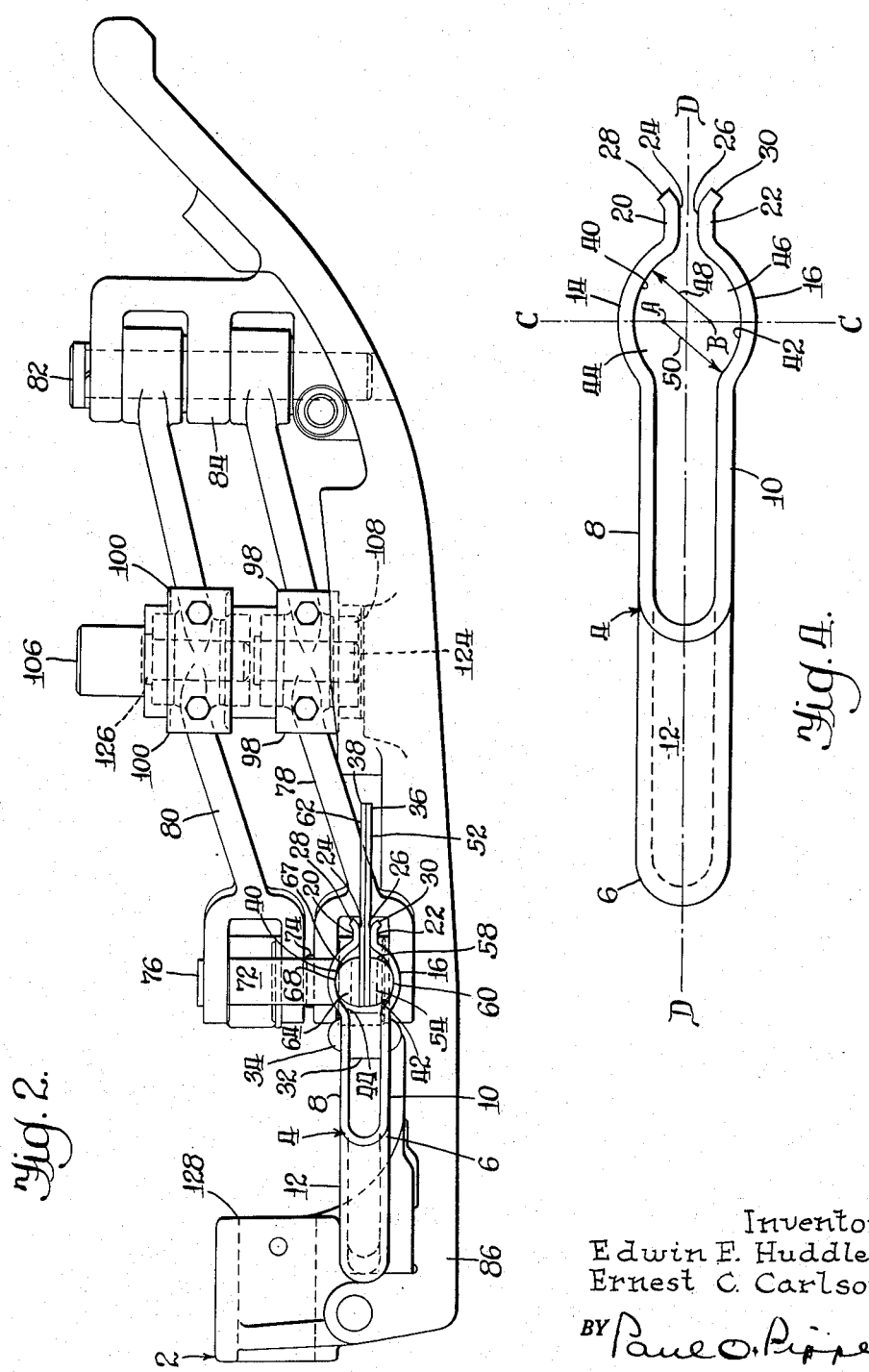

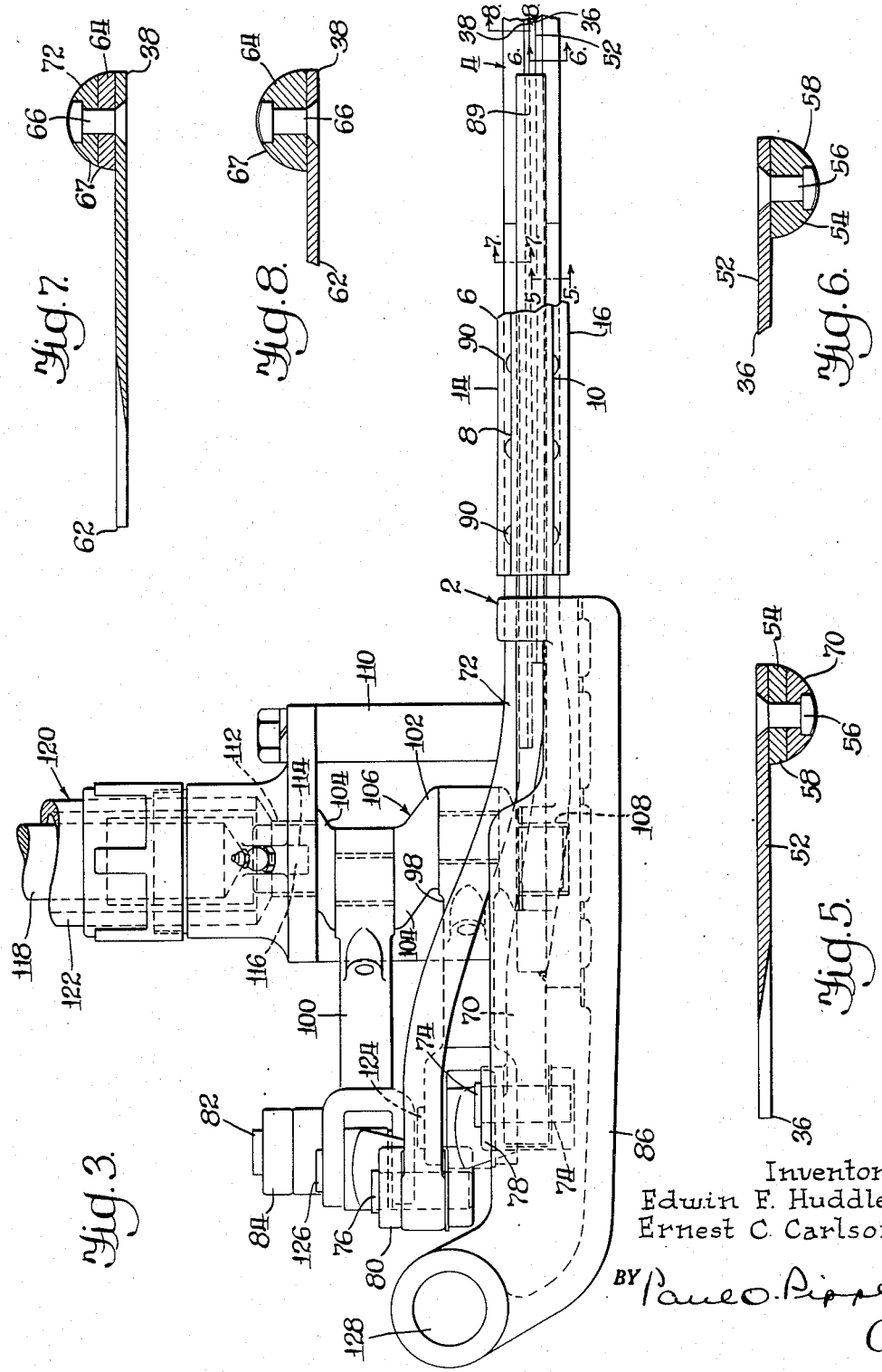

2,664,690

UNITED STATES PATENT OFFICE 2,664,690

DOUBLE SICKLE TYPE MOWER

Edwin F. Huddle, Elmwood Park, and Ernest C. Carlson, Chicago, Ill., assignors to International Harvester Company, a corporation of New Jersey Application December 7, 1951, Serial No. 260,496

10 Claims. (Cl. 56—297)

This invention relates to cutting apparatus and more particularly to double sickle mowers.

A general object of the invention is to provide an efficient improved mower of simple, durable and relatively inexpensive design.

A more specific object is to devise a novel double sickle mower wherein the sickles are carried within a sheath in guided engagement therewith whereby to control their movements.

A further object is to develop novel engaging areas between the sickles and the sheath such as to obtain close coupling between the superposed sickles to maintain an effective shearing action while at the same time permitting relative lateral angling between the sickles concomitantly with longitudinal reciprocation thereof.

The invention contemplates the provision of a cutter mechanism including a pair of superposed knife blades enclosed along their rear edges between opposed jaws of a supporting sheath, each blade and related jaw engaging along tangential contours and the sheath being formed of flexible material to accommodate slight lateral displacement of the blades during reciprocation thereof accompanied by slight separation of the jaws, the jaws biasing the blades towards each other along substantially the full length thereof to insure effective shearing action and approximately uniform frictional loading throughout the operating range of the blades to maintain dynamic balance.

The invention further comprehends novel operating means for the knife blades and features a double crank driving a pair of swing links connected to respective blades, the links being pendulated in the cutting planes of the blades and pivotally connected thereto on axes perpendicular to the cutting planes to maintain the blades in close coupled shearing relationship and to restrict their movement to said planes whereby augmenting the cooperative relationship between the engaging curved surfaces on the blades and the embracing jaws.

A still further object is to provide the sheath with lips at the forward extremities of the jaws, the lips engaging the remote surfaces of the knives extending therebetween on substantially flat areas along the full lengths of the knives and the forward edges of the lips being outturned to form a channel section to develop transverse rigidity, the lips also serving as additional supports for the knives and shielding the cooperating movement-controlling surfaces of the jaws and the knives from the entry of clogging matter, such as grasses, therebetween.

These and other objects of the invention will become more apparent from the specification and the drawings, wherein:

Figure 1 is a broken apart top plan view of the novel mower.

Figure 2 is an end view of the mower with the runner and divider at the grassward end thereof removed.

Figure 3 is a fragmentary rear view thereof.

Figure 4 is an enlarged end view of the sheath taken from the grassward end thereof.

Figures 5 and 6 are enlarged cross sectional views of the bottom knife blade taken substantially in the planes indicated by the lines 5—5 and 6—6 of Figure 3, and Figures 7 and 8 are enlarged cross sectional views of the top knife blade taken in the planes substantially as indicated by the lines 7—7 and 8—8 of Figure 3.

Describing the invention in detail, the mower generally designated 2 comprises an elongated support structure generally designated 4, the structure 4 including a U-shaped sheath 6 formed of sheet steel and comprising top and bottom webs 8 and 10 interconnected along their rear edges by an integral rear web 12 forming the bight of the U. It will be seen in Figure 1 that the sheath is tapered toward the grainward end of the mower. The top and bottom webs 8 and 10 are formed along their forward edges with oppositely convexed jaw portions 14 and 16 respectively which along their forward edges terminate in lips 20 and 22 defining opposing substantially flat bearing areas 24 and 26 spaced transversely thereof. The forward margins of the lips are outturned as at 28 and 30 respectively to develop channel sections along the forward extremity of the sheath to improve its transverse rigidity.

The top and bottom parts of the sheath are maintained separated by means of a longitudinally extending separator or bar 32 disposed therebetween along the rear ends of the jaws 14 and 16. The bar 32 may be secured to the top and bottom webs 8 and 10 as by rivets 34, 34.

A pair of superposed knife blades or sickles 36 and 38 are received at their rear edges between the jaws 14 and 16.

Referring now to Figure 4, it will be seen that the axes of curvature A and B of the concave surfaces 40 and 42 on the interiors of the jaws 14 and 16 lie in a common vertical plane C, C passing through the longitudinal median lines of the channels 44 and 46 formed by the jaws 14 and 16 and that the radii of curvature 48 and 50 of surfaces 40 and 42, respectively, are substantially equal. The axis A is spaced the same distance above, as the axis B is disposed below the intersection of the horizontal center plane D, D of the sheath with the plane C, C.

Referring now particularly to Figures 5 and 6, the sickle 36 comprises a plurality of flat toothed blades 52, which are mounted end to end on the flat top side of a connecting guide bar 54 and secured thereto as by rivets 56. The bar 54 reposes within the channel 46 and is formed with a semi-cylindrical surface 58 in tangential engagement as at 60 (Figure 2) with surface 42.

Similarly, the sickle 38 (Figures 7 and 8) comprises a plurality of flat toothed blades 62, 62 mounted end to end on flat bottom side of a connecting guide bar 64 and secured thereto as by rivets 66, 66. The bar 64 is fitted within the channel 44 and comprises a semi-cylindrical contour 67 in tangential engagement as at 68 (Figure 2) with the surface 40. Forwardly of the channels, the sickles are guided between the lip surfaces 24 and 26 which are engageable on surfaces 24 and 26 with the outer sides of blades 62, 52 respectively.

The inboard ends of the bars 54 and 64 are rigidly connected to one of the ends of rod 70 and 72, respectively, which are inset thereinto. The rods 70 and 72 are formed along the length of the sickles 36 and 38 of matching profile to bars 54 and 64 and in effect form continuations thereof. Outwardly of the sickles the rods 70 and 72 are offset upwardly slightly and at their far ends are positioned substantially parallel. The rods 70 and 72 are pivoted on generally vertical axes as at 74 and 76 by suitable pins to the rear ends of swing links or levers 78 and 80, the levers 78 and 80 extending forwardly from the cutter and pivoted at their other or forward ends of a common generally vertical axis as by pin 82 extending through a bracket 84 on the forward extremity of a runner 86 adapted to support the stubbleward end of the cutter.

The runner 86 is secured as by rivets 88, 88 to a relatively wide outboardly extending plate 89 which telescopes within the stubbleward broad end of the sheath and is secured to the top and bottom webs 8 and 10 as by rivets 90.

The grassward end of the cutter is provided with a combination runner and divider 92 which includes a tongue 94 telescoped within the adjacent end of the sheath between the separator 32 and rear web 12 and is secured as by rivets 96, 96 to the webs 8 and 10.

Referring now to Figures 1 to 3, the levers 78 and 80 are pendulated in substantially horizontal planes by means of rods or links 98 and 100 which at one of their ends are journalled on crank arms 102 and 104 respectively, said crank arms being disposed 180 degrees out of phase with each other and formed as part of a crank 106, the lower end of which is journalled within a bearing 108 carried by the runner 86 at the lower end of a housing 110 which is secured to the runner and shields the crank, the housing 110 carrying at its upper end a bearing 112 for journaling the upper end of the crank. The upper end of the crank is provided with a socket 114 which receives a key member 116 which is connected to or formed part of the output end of a core 118 of a flexible shaft assembly 120. The shaft assembly 120 may comprise a sheath 122 about the core and connected to the housing 110 as by telescoping over the upper end of the bearing assembly 112.

In operation the flexible shaft drives the crank, the shaft being connected in any convenient manner to a power source such as the power take-off of a tractor. The crank arm 102 drives the link 98 which is pivoted at its far end on a substantially vertical axis as at 124 to the lever 78 intermediate the ends thereof. Similarly, the rod 100 is reciprocated by crank arm 104, the rod 100 being pivotally connected at its far end on a substantially vertical axis as at 126 to the lever 80 intermediate the ends thereof. It will be appreciated that the levers 78 and 80 are pendulated in substantially horizontal planes and this movement is transmitted to the sickles. It will be further appreciated that the lever members 78 and 80 swing in arcs and that the arcuate paths of travel of the points 74 and 76 effect lateral shifting as well as longitudinal movement of the sickles 36 and 38. Thus, in addition to reciprocation longitudinally, the sickles are also continuously shifted laterally. The lateral reciprocation of the sickles is accommodated by the spreading action of the resilient jaws and the tangential engagement between the surfaces 58, 42 and 67, 40 shifts laterally. However, since the engagement is tangential at all times due to the nature of the construction, only line contact is maintained and the frictional drag is reduced to a minimum. The line contact engagement further establishes substantially uniform frictional characteristics throughout the entire operating range of the sickles so as to maintain dynamic balance in the system. It will be observed that this line contact oscillates substantially an equal extent at opposite sides of the median line of the associated channel. Thus minimum stressing of the jaws and flexing thereof is established. The disposition of the levers 78 and 80 and their connection with the sickles also controls the movement of the sickles to the cutting planes thereof. The increased rigidity of the inner ends of the jaws by interconnection with the bar 32 resists spreading action by the knives as they are pushed into the crop.

The stubbleward side of the runner 86 is provided with a pair of alined eyes 128, 128 for a pivotal connection to an associated yoke (not shown), the yoke being of any suitable type and may be such as shown in U. S. Patent 2,403,365.

What is claimed is:

1. In a mower, an elongated support comprising a U-shaped sheath formed of flexible material and presenting top and bottom webs and an intervening rear web, said top and bottom webs having forward portions convexed away from each other and developing substantially parallel facing channels providing concaved bearing surfaces, a pair of superposed knife blades entered along their rear edges between said portions, each blade and adjacent portion engaging within the related channel, along the bearing surface therein tangentially longitudinally thereof, and driving means for each blade including pendular means pivotally connected to the stubbleward end of the blade on an axis substantially perpendicular to the cutting plane of the blade and having an arc of movement adapted to reciprocate the blade longitudinally and laterally generally parallel to the cutting plane thereof, the engagement between each blade and related surface providing substantially line contact therebetween during the entire operating range of movement of the blade.

2. For a mower assembly, an elongated support including a pair of opposed members presenting facing concave bearing surfaces extending longitudinally of the support at opposite sides of the central lateral plane thereof, said surfaces being of substantially equal radii, the axes of curvature of said surfaces being located in a common plane bisecting both surfaces longitudinally, and the axis of curvature of each surface being disposed on the far side of said central lateral plane as respects thereto.

3. For a mower assembly, an elongated support including a pair of opposed facing concave surfaces of substantially equal radii, the axis of curvature of each surface being disposed closer to the other surface than thereto and axes of both surfaces being located in a longitudinal median plane of said surfaces.

4. In a mower, a sheath having spaced webs presenting opposed transversely curved longitudinally elongated surface areas, a pair of sickles arranged in shearing relationship and extending between said areas, each sickle having a curved face opposing and engaging the adjacent surface and of a lesser radius than the latter whereby having substantially line contact therewith longitudinally thereof, and means for concomitantly reciprocating said sickles longitudinally and laterally in the cutting planes thereof, said webs being movable transversely to accommodate said transverse movement while in engagement with respective faces, the engagement of each face and associated surface areas developing substantially constant friction characteristics throughout the full extent of movement of the sickles so as to substantially maintain dynamic balance between said sickles, said faces of the sickles and respective engaging surfaces developing a wedging action therebetween to maintain said sickles in shearing relationship.

5. In a mower, a U-shaped sheath including spaced top and bottom webs and an interconnecting rear web, outwardly convexed resilient jaws forming the forward portions of said webs and developing longitudinal opposed channels presenting curved bearing faces, said webs terminating at their front edges in outturned spaced lips presenting opposing bearing surfaces, a pair of sickles associated in shearing relationship entered at their rear extremities between said portions and each comprising knife blade means slidably engageable with the adjacent bearing surface, each sickle having a semicylindrical convexity projecting into the channel of the adjacent jaw and having a lesser radius than the bearing face of the related concavity and in engagement therewith along a line of tangency extending longitudinally of the sheath, lever members connected at one end to respective sickles on axes substantially perpendicular to the cutting planes of the sickles and pivoted at their opposite ends on a common axis substantially parallel to said axes, a double crank journalled alongside said levers on an axis parallel to said axes, means operatively interconnecting one portion of the crank to one of said levers intermediate the ends thereof and means operatively connecting another portion of the crank to the other of said levers intermediate the ends thereof, and means for driving said crank, said levers controlling the reciprocation of said sickles in the cutting planes thereof whereby restricting movement of the sickles to planes parallel to the plane of engagement therebetween whereby an effective shearing action is developed and the related bearing surfaces on the sickles and said concavities are maintained in contact along the entire extents thereof for the full operating range of the sickles.

6. In a mower, a sheath formed of flexible material and comprising spaced top and bottom webs and an interconnecting rear web, separator means interconnecting said webs intermediate the forward and rear extremities thereof, said webs being formed with outwardly convexed jaws forwardly of said separator means and presenting substantially identical nonconcentric facing bearing surfaces elongated longitudinally of the sheath.

7. In a mower, an elongated support comprising spaced top and bottom portions, said portions including jaws convexed away from each other to form facing channels extending the lengthwise of the support, the surface areas of said channels providing bearing means for associated sickles and being of substantially equal radii and defined from different axes located in a common plane.

8. In a mower, a U-shaped sheath having spaced top and bottom substantially parallel webs, said webs presenting transversely movable opposed jaws at their forward edges with concave bearing surfaces on adjacent sides of the jaws, a pair of sickles interposed between the jaws and each having convex face in tangential engagement with an adjacent surface, and means for operating the sickles and confining their movements to planes substantially parallel to said webs whereby maintaining said engagement between corresponding faces and surfaces for the entire extent of movement of the sickles, the contours of said surfaces and faces upon lateral movement of the sickles separating said jaws without changing the character of engagement therebetween, said surfaces and faces developing a wedging action therebetween maintaining the sickles in close coupled shearing relationship.

9. In a mower of the type described, a U-shaped sheath including spaced top and bottom webs and an interconnecting rear web, outwardly convexed jaws on the forward portions of said webs, and lips on the forward margins of said jaws with outturned forward edges whereby forming transverse channels rigidifying the forward extremities of said sheath.

10. In a mower, an elongated support structure comprising a pair of resilient upper and lower opposed portions, a pair of knife elements disposed in shearing relationship and each having a corresponding longitudinal marginal edge section entered between said portions, each section and adjacent portion presenting opposing curved surfaces in tangential wedged engagement with each other, and means operatively associated with said knife elements for concomitantly reciprocating the same longitudinally and laterally against the resiliency of said portions to obtain close coupled shearing relationship between said elements and effect mutual cleaning action between said elements.

EDWIN F. HUDDLE.
ERNEST C. CARLSON.

References Cited in the file of this patent

UNITED STATES PATENTS

| Number | Name | Date |
|---|---|---|
| 631,009 | Hahn | Aug. 15, 1899 |
| 922,291 | Kibbe | May 18, 1909 |

FOREIGN PATENTS

| Number | Country | Date |
|---|---|---|
| 368 | Great Britain | Feb. 7, 1866 |
| 165,734 | Switzerland | Feb. 16, 1934 |